United States Patent [19]

O'Dea et al.

[11] Patent Number: 5,511,232
[45] Date of Patent: Apr. 23, 1996

[54] METHOD FOR PROVIDING AUTONOMOUS RADIO TALK GROUP CONFIGURATION

[75] Inventors: Robert J. O'Dea, Ft. Lauderdale; Jimmy W. Cadd, Coral Springs, both of Fla.

[73] Assignee: Motorola, Inc., Schaumburg, Ill.

[21] Appl. No.: 348,529

[22] Filed: Dec. 2, 1994

[51] Int. Cl.$^6$ .............................. H04B 7/26; H04Q 7/20
[52] U.S. Cl. ............................................ 455/54.1; 455/88
[58] Field of Search ............................. 455/34.1, 34.2, 455/53.1, 54.1, 54.2, 88

[56] References Cited

U.S. PATENT DOCUMENTS

| | | | |
|---|---|---|---|
| 4,972,460 | 11/1990 | Sasuta | 379/60 |
| 5,235,631 | 8/1993 | Grube et al. | 455/34.2 |
| 5,279,521 | 1/1994 | Johlie et al. | 455/34.1 |
| 5,371,900 | 12/1994 | Bar-On et al. | 455/54.1 |
| 5,392,454 | 2/1995 | Kowal et al. | 455/54.1 |

*Primary Examiner*—Chi H. Pham
*Attorney, Agent, or Firm*—Andrew S. Fuller

[57] ABSTRACT

A method is provided for autonomous radio talk group configuration among radio transceivers. The radio transceivers are placed in a group configuration mode that operates on a communication channel (310, 320). A configuration master transceiver is selected and the other transceivers designated as configuration slave transceivers (330). The configuration master transceiver transmits radio talk group identification information on the communication channel, and the configuration slave transceivers receive and store this radio talk group identification information for use in radio talk group communications (340).

18 Claims, 5 Drawing Sheets

METHOD FOR PROVIDING AUTONOMOUS RADIO TALK GROUP CONFIGURATION

TECHNICAL FIELD

This invention relates in general to the configuration of radio transceivers for operation in a loosely coupled radio communication system.

BACKGROUND OF THE INVENTION

Wireless radio communication systems often support group call among communication units, such as two-way radio transceivers (radios), and the like. Group call allows two or more radios to be configured into a talk group such that transmission from one member of the group will be received by other members of the group. Accordingly, several radios may be accessed simultaneously without having to uniquely identify particular radios. Additionally, unlike a transmission on a shared communication channel that is monitored by all units in the communication system, group call affords a certain degree of privacy in that only members of the group may participate in the communications.

In a typical communication system, group call capability is configured by programming, or otherwise configuring, a radio with certain parameters to support group call. Generally, group membership is predetermined and groups are assigned to particular switch positions or modes of a radio. In a tightly coupled system, such as a trunked radio communication system, a controller is provided for managing communications among various radios. The controller provides radio talk group management through a corresponding central database or table, usually containing preassigned group memberships. Group call operation is typically configured through a combination of software programming within an individual radio, and group configuration parameters selected from the central database. In a loosely coupled communication system, such as a conventional two-way communication system, radio talk groups are pre-configured using a programming tool, such that the radio operates on one or more radio talk groups when a particular operation mode is selected. This pre-configuration process requires access to common information which must be programmed into the radio transceiver during the configuration process.

Radio communication systems are being developed in which low-tiered, low cost subscriber units share several communication channels under a particular channel use protocol. These radios are designed to operate on the shared communication channels without the aid of an infrastructure, such as a base station or controller, which manages frequency assignments, user access, and other operational aspects of a radio communication system. For example, a radio may be available pre-configured to operate on a set of several hundred communication channels under a particular protocol. These radios would offer a simple, user-friendly interface, and would be available to a customer ready for operation with minimal user configuration.

It is desirable to offer a system in which a radio group call feature would be available on the above-mentioned low cost radios. Group call configuration has typically required factory preprogramming, or the use of a radio software programming tool. Trunked communication systems provide additional infrastructure based configuration procedures, such as through a controller. Preferably, low cost radio systems would be offered to customers without the need for such complex configuration requirements. Thus, there exists a need to provide customer, or end user, configurable group talk capability, without the need for infrastructure support, or expensive programming tools.

DETAILED DESCRIPTION OF THE PREFERRED EMBODIMENT

Figure 1:
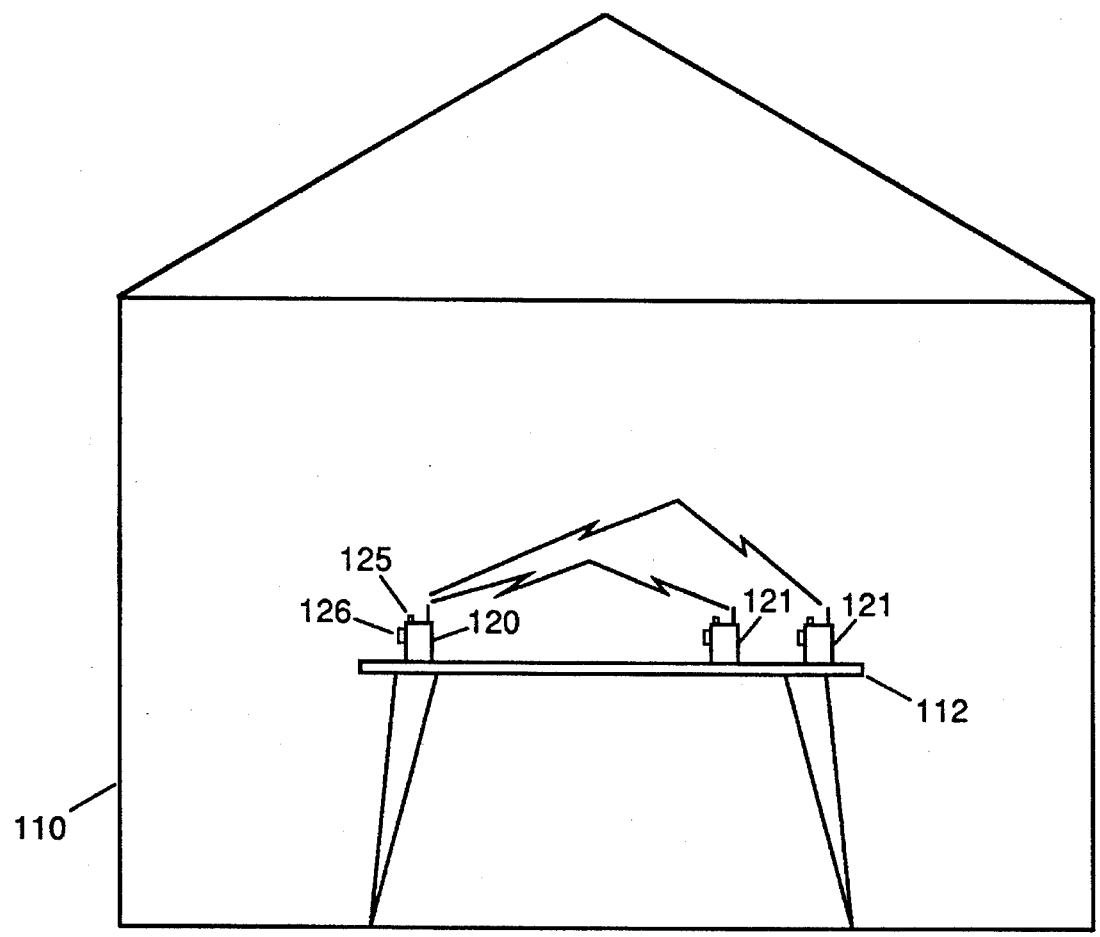
FIG. 1 shows a group of substantially similar radio transceivers in a common physical location undergoing radio talk group configuration, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides a method for autonomously configuring radio talk group information among a group of radio transceivers. Each radio transceiver is operable in a talk group configuration mode on a particular communication channel to configure a radio talk group. To configure a radio talk group, a configuration master transceiver is selected from among the group and the other transceivers designated as configuration slaves. The transceivers are placed in configuration mode, and radio talk group information is exchanged among the transceivers on the particular communication channel under the control of the configuration master transceiver.

FIG. 1 shows a system 100 in which a group of substantially similar radio transceivers 120, 121 are operating in radio talk group configuration mode, in accordance with the present invention. Preferably, the radio transceivers 120, 121 are placed in a common physical location, such as on a support structure 112 in a localized area 110. Each radio transceiver 120, 121 supports a talk group configuration mode which is operable on a particular shared communication channel. In the preferred embodiment, configuration mode is enabled by turning on a on/off switch 125 while engaging a push-to-talk switch 126. One of the radio transceivers operates as a configuration master transceiver 120, while the other transceivers operate as configuration slave transceivers 121. The configuration master transceiver 120 communicates with the configuration slave transceivers 121 to build or compile a radio talk group table or database, which is shared among all the radio transceivers 120, 121. The talk group database enables the radio transceivers to operate as a group on shared communication channels.

Figure 2:
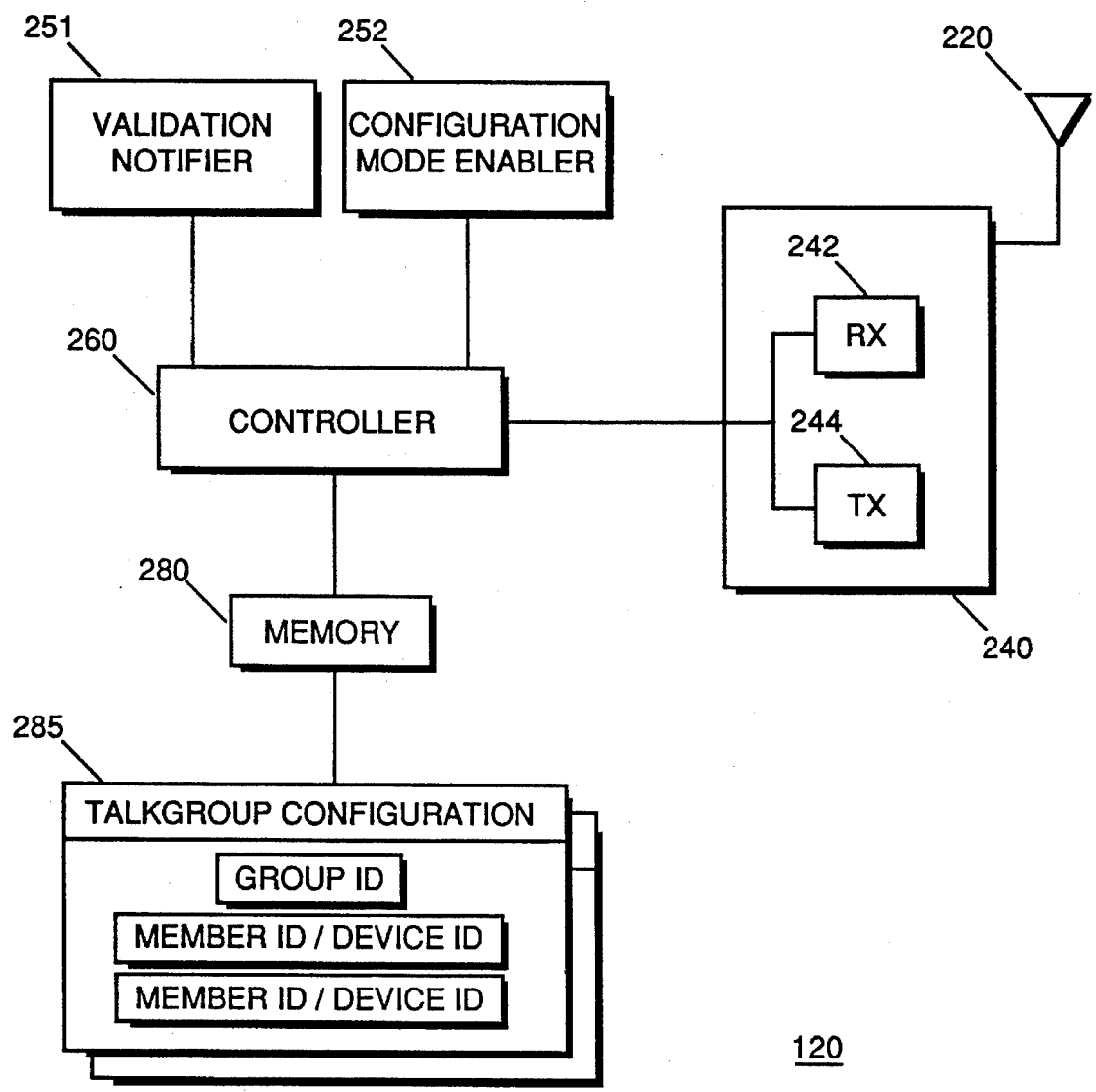
FIG. 2 is a block diagram representing one of the transceivers in FIG. 1, in accordance with the present invention.

FIG. 2 shows a block diagram of a radio transceiver, such as transceiver 120, in accordance with the present invention. The other transceivers 121 are similar in nature. Preferably the radio transceiver 120 is a two-way mobile or portable radio, capable of receive and transmit operations using well known principles. A controller 260 uses logic and other information from an electrically coupled internal memory 280 to control the overall operation of the radio transceiver 120. The controller 260 is electrically coupled to a transceiver portion 240, which includes a receiver 242 and a transmitter 244. The transceiver portion 240 is electrically coupled to an antenna 220. For receive operations, communication signals are received by the antenna 220 and selectively processed by the receiver 242. Similarly, for transmit operations, communication signals are processed by the transmitter 244 and radiated through the antenna 220. The transmitter 244 and the receiver 242 operate under the control of the controller 260. The radio transceiver 120 also includes a configuration mode enabler 252 which is electrically coupled to the controller. The configuration mode enabler 252, which may be a combination of a radio on/off switch and a radio push-to-talk switch as mentioned above, operates to place the radio transceiver 120 into radio talk group configuration mode. A validation notifier 251, also coupled to the controller 260, provides notification when radio talk group configuration is complete and validated. The validation notifier 251 may be in the form of a light emitting diode or other display device, a tone generator, or like alerting mechanism.

The memory 280 also stores radio talk group information in one or more configuration tables or databases 285. A radio talk group configuration table includes, at a minimum, a radio talk group identifier, for use in talk group communications. Moreover in the preferred embodiment, the radio talk group configuration information includes a group member identifier and a device identifier, for each radio transceiver within a particular radio talk group.

Figure 3:
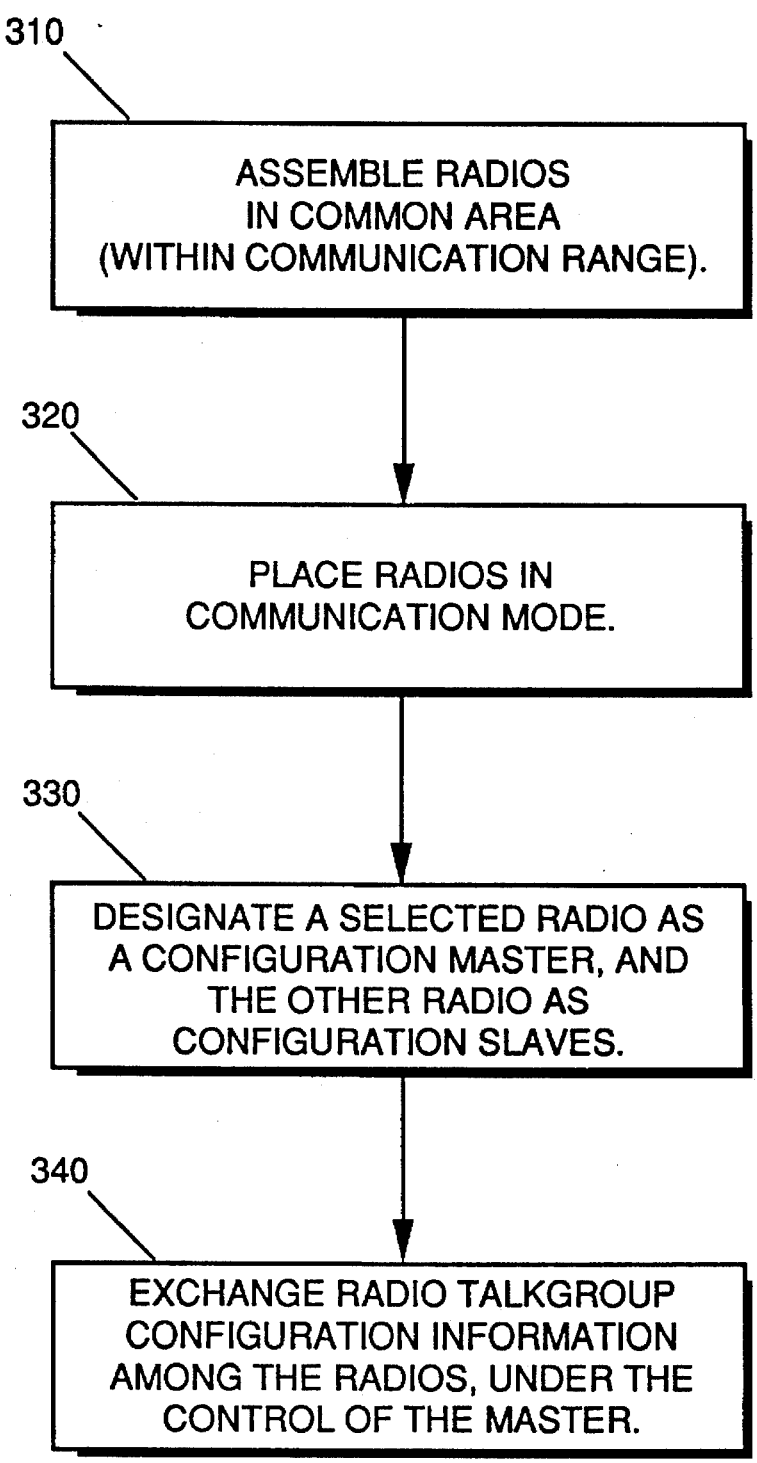
FIG. 3 is a flowchart showing radio talk group configuration operations, in accordance with the present invention.

FIG. 3 is a flowchart summarizing the radio talk group configuration process, in accordance with the present invention. Preferably, a group of substantially similar radio transceivers, each supporting a radio talk group configuration mode, is assembled in a common physical location, such that the radio transceivers are situated to be within communication range of each other, step 310. When assembled in a common physical location, the radio transceivers are operated to transmit with reduced link gain, such as by transmitting in a low power mode, or by transmitting with a limited communication range. The radio transceivers are then placed in configuration mode, step 320. In the preferred embodiment, the radio transceivers are placed in radio talk group configuration mode by turning on each radio transceiver, while engaging a push-to-talk switch. The radio transceivers are then divided such that one of the radio transceivers is selected as a configuration master transceiver, and the other transceivers are designated or function as configuration slave transceivers, step 330. Radio talk group configuration information is then automatically exchanged among the radio transceivers under the control of the configuration master, step 340. Preferably, radio talk group identification information is compiled by exchanging radio identification information among the radio transceivers to obtain group membership information. The configuration master transceiver transmits the group membership information on a shared information channel such that the configuration slave transceivers receive and store the radio talk group identification information for use in radio talk group communications. Upon completion of the configuration process, the group membership information is stored and maintained by each of the radio transceivers. A radio transceiver may be capable of storing multiple group personalities, such that the radio may selectively operate in multiple groups. In this case, the radio talk group configuration is stored in particular memory locations reserved for multiple talk group configurations.

Figure 4:
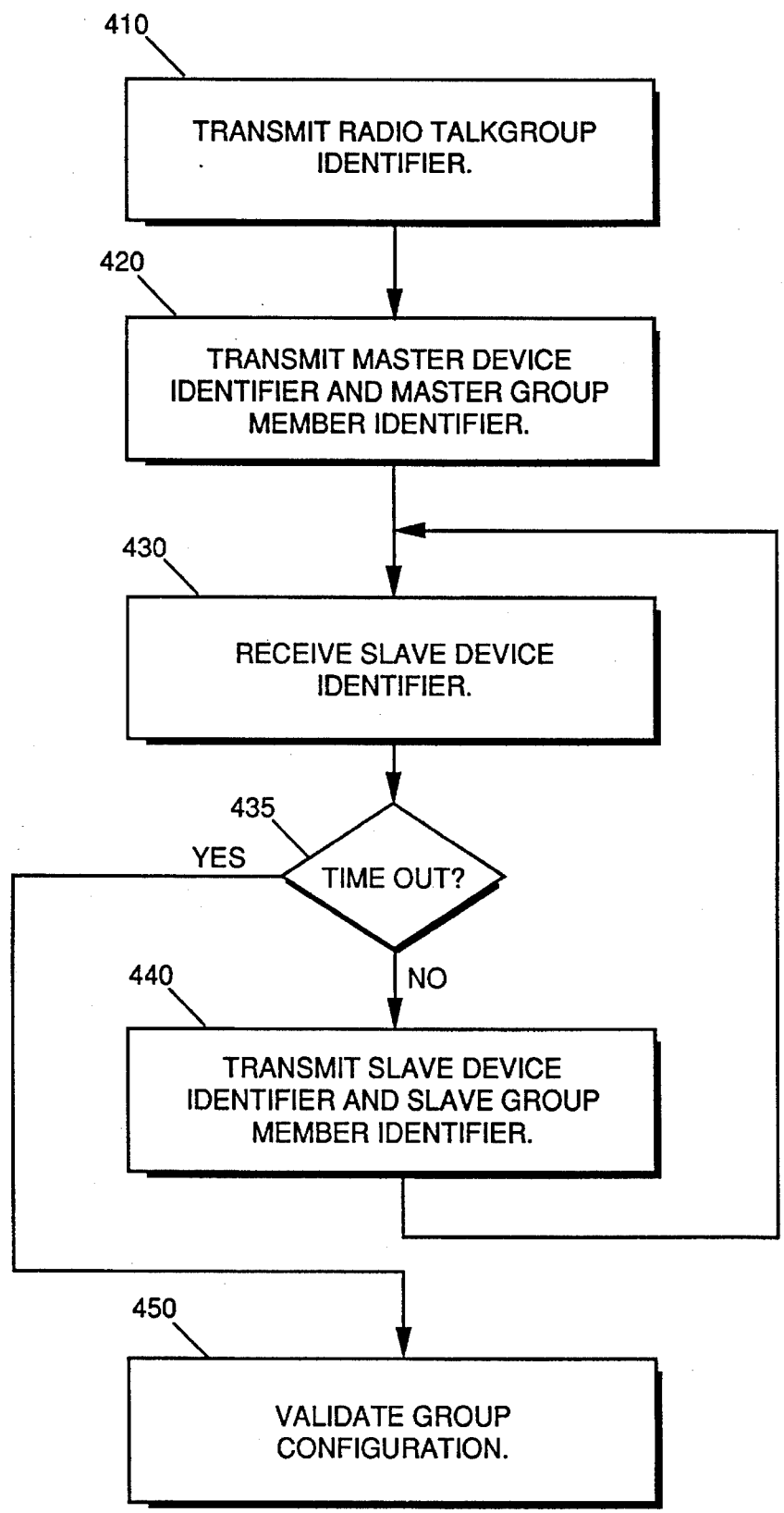
FIG. 4 is a flowchart showing configuration operations in a transceiver selected as the configuration master transceiver, in accordance with the present invention.
Figure 5:
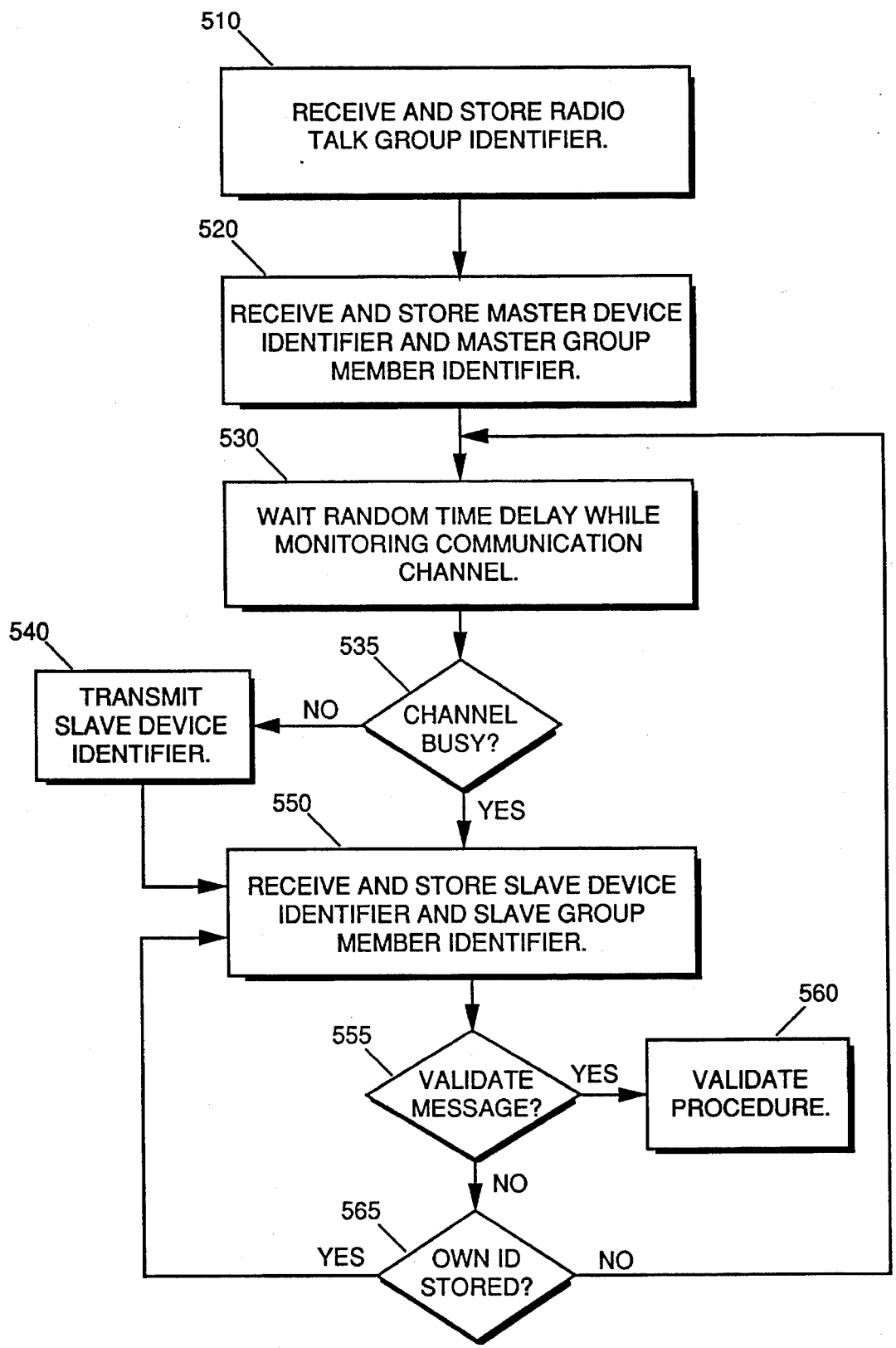
FIG. 5 is a flowchart showing configuration operations in a configuration slave transceiver, in accordance with the present invention.

FIG. 4 is a flowchart showing configuration operations at the configuration master transceiver, in accordance with the present invention. FIG. 5 is a flowchart showing configuration operations at a configuration slave transceiver during a radio talk group configuration, in accordance with the present invention. Referring to FIGS. 4 and 5, the radio transceivers operate to exchange radio identification information in order to compile radio talk group information which is stored at respective radio transceivers. At the configuration master transceiver, a radio talk group identifier is selected to serve as an identifier for group communications. In a first embodiment, a random radio talk group identifier is selected. In a second embodiment, the radio talk group identifier is based on a device identifier corresponding to the configuration master transceiver.

The configuration master initiates the radio talk group configuration process by transmitting the radio talk group identifier on the shared communication channel, step 410. Each configuration slave transceiver receives and stores the radio talk group identifier, step 510. The configuration master transceiver then transmits a master device identifier, and a master group member identifier, corresponding to the configuration master transceiver, step 420. At the configuration slave transceiver, the master device identifier and the master group identifier are received and stored in an internal memory, step 520. Each configuration slave transceiver then waits for a distinct random time delay period to respond to the configuration master transceiver while monitoring the shared communication channel to detect channel activity, step 530. Channel activity may reflect communications by the configuration master transceiver or other configuration slave transceivers. If the channel is not busy for the duration of the delay period, the configuration slave transceiver transmits a corresponding slave device identifier to the configuration master transceiver, step 540. The configuration master transceiver receives this slave device identifier, step 430, and assigns a slave group member identifier to provide operational control for group communications. The previously received slave device identifier, and the newly assigned slave group member identifier, are transmitted on the shared communication channel, step 440. The configuration master transceiver continues to receive transmissions of slave device identifiers from configuration slave transceivers until a predetermined time period elapses without further transmissions, i.e., there is no additional channel activity. When this time out occurs, step 435, the configuration master transceiver assumes that there are no additional configuration slave transceivers to process and proceeds to validate the radio talk group configuration, step 450.

A configuration slave transceiver keeps attempting to transmit its slave device identifier, when no channel activity is detected, step 535, 540, until it receives a transmission from the configuration master transceiver including its slave device identifier with a corresponding group member identifier, step 565. Meanwhile, the configuration slave transceiver receives and stores slave device identifiers and corresponding slave group member identifiers in an internal memory as transmitted by the configuration master transceiver, step 550. This process continues until the configuration slave transceiver receives and processes a validate message from the configuration master transceiver, steps 555, 560.

In another embodiment, the configuration master and slave transceivers may operate such that the radio talk group information is compiled and stored in the configuration master transceiver. After compilation, the entire configuration table is transmitted to each configuration slave transceiver.

Preferably the configuration master transceiver communicates with each configuration slave transceiver to validate the respective radio talk group information. The configuration master transmits a configuration validation request to a configuration slave transceiver, which responds by transmitting the radio talk group configuration information compiled. After validation, the configuration master transmits a configuration validated message to each validated configuration slave transceiver. Upon receipt of the configuration validated message, each configuration slave transceiver enables a radio talk group notifier, such as by emitting tones or by activating a display device.

The present invention offers significant advantages. The autonomous group configuration protocol described herein can function in a low-cost infrastructureless system with minimal user interaction. After each radio transceiver is placed in a radio talk group configuration mode, all operations may occur automatically without any user interaction. Thus a low-tier, low cost radio transceiver with minimal external device controls can be programmed to operate within a particular radio talk group with relative ease. The group membership information is maintained at each individual radio transceiver such that subsets of the group can operate independently once configured.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of providing autonomous radio talk group configuration, comprising the steps of:
    providing a plurality of radio transceivers each supporting a radio talk group configuration mode operable on a particular communication channel;
    placing the plurality of radio transceivers in radio talk group configuration mode;
    dividing the plurality of radio transceivers into a configuration master transceiver and at least one configuration slave transceiver;
    at the configuration master transceiver: transmitting radio talk group identification information on the particular communication channel;
    at the at least one configuration slave transceiver: receiving the radio talk group identification information; and storing the radio talk group identification information for use in radio talk group communications.

2. The method of claim 1, further comprising the step of maintaining group member information at each of the plurality of radio transceivers.

3. The method of claim 2, further comprising the step of exchanging radio identification information among the plurality of radio transceivers to compile the group member information.

4. The method of claim 1, wherein the step of transmitting radio talk group identification information, comprises the step of selecting a random radio talk group identifier.

5. The method of claim 1, wherein the step of transmitting radio talk group identification information, comprises the step of selecting a radio talk group identifier based on a device identifier corresponding to the configuration master transceiver.

6. The method of claim 1, further comprising the steps of:
    at the configuration master transceiver:
        transmitting a master device identifier, and a master group member identifier;
    at the at least one configuration slave transceiver:
        receiving the master device identifier and the master group member identifier;
        storing the master device identifier and the master group member identifier in an internal memory; and
        transmitting, after a random time delay, a slave device identifier corresponding to the at least one configuration slave transceiver.

7. The method of claim 6, wherein the step of transmitting, after a random time delay, includes the step of monitoring for channel activity on the particular communication channel.

8. The method of claim 6, further comprising the steps of:
    at the configuration master transceiver:
        receiving the slave device identifier;
        transmitting a slave group member identifier and the slave device identifier;
    at the at least one configuration slave transceiver:
        receiving the slave device identifier and the slave group member identifier; and
        storing the slave device identifier and the slave group member identifier in an internal memory.

9. The method of claim 8, further comprising the steps of:
    at the configuration master transceiver:
        transmitting a radio talk group configuration validation request;
        receiving radio talk group configuration information from the at least one configuration slave transceiver;
        validating the radio talk group configuration information; and
        transmitting a configuration validated message to the at least one configuration slave transceiver.

10. The method of claim 9, further comprising the steps of, enabling, by the at least one configuration slave transceiver, a radio talk group configuration notifier upon receipt of the configuration validated message.

11. The method of claim 1, further comprising the steps of:
    compiling, in an internal memory of the configuration master transceiver, group member identification information for the plurality of radio transceivers; and
    transmitting the group member identification information to the at least one configuration slave transceiver.

12. The method of claim 11, further comprising the steps of validating, at the configuration master transceiver, receipt of the group member identification information transmitted to the at least one configuration slave transceiver.

13. The method of claim 1, further comprising the step of storing multiple instances of radio talk group identification information in the plurality of radio transceivers.

14. The method of claim 1, wherein the step of placing the plurality of radio transceivers in radio talk group configuration mode, comprises the step of turning on each of the plurality of radio transceivers while engaging a push-to-talk switch.

15. The method of claim 1, further comprising the steps of:
    assembling the plurality of radio transceivers in a common physical location; and
    operating the plurality of radio transceivers with a reduced link gain while in the radio talk group configuration mode.

16. A method of providing autonomous radio talk group configuration, comprising the steps of:
- providing a plurality of radio transceivers each supporting a radio talk group configuration mode operable on a particular communication channel;
- assembling the plurality of radio transceivers in a common physical location;
- placing the plurality of radio transceivers in radio talk group configuration mode;
- operating the plurality of radio transceivers with a reduced link gain while in the radio talk group configuration mode;
- dividing the plurality of radio transceivers into a configuration master transceiver and at least one configuration slave transceiver;
- at the configuration master transceiver:
  - transmitting a radio talk group identifier on the particular communication channel;
  - transmitting a master device identifier, and a master group member identifier;
  - receiving a slave device identifier;
  - transmitting a slave group member identifier and the slave device identifier;
- at each of the at least one configuration slave transceiver:
  - receiving the radio talk group identifier;
  - storing the radio talk group identifier for use in radio talk group communications;
  - receiving the master device identifier and the master group member identifier;
  - storing the master device identifier and the master group member identifier in an internal memory;
  - transmitting, after a random time delay, the slave device identifier corresponding to the at least one configuration slave transceiver;
  - receiving the slave device identifier and the slave group member identifier; and
  - storing the slave device identifier and the slave group member identifier in an internal memory.

17. The method of claim 16, further comprising the steps off
- at the configuration master transceiver:
  - transmitting a radio talk group configuration validation request;
  - receiving, from the at least one configuration slave transceiver, radio talk group configuration information;
  - validating the radio talk group configuration information; and
  - transmitting a configuration validated message to the at least one configuration slave transceiver.

18. The method of claim 17, further comprising the steps of, enabling, by the at least one configuration slave transceiver, a radio talk group configuration notifier upon receipt of the configuration validated message.

* * * * *